May 9, 1950     E. GINN ET AL     2,506,920
HAND POWER LINE
Filed June 28, 1945     2 Sheets-Sheet 1
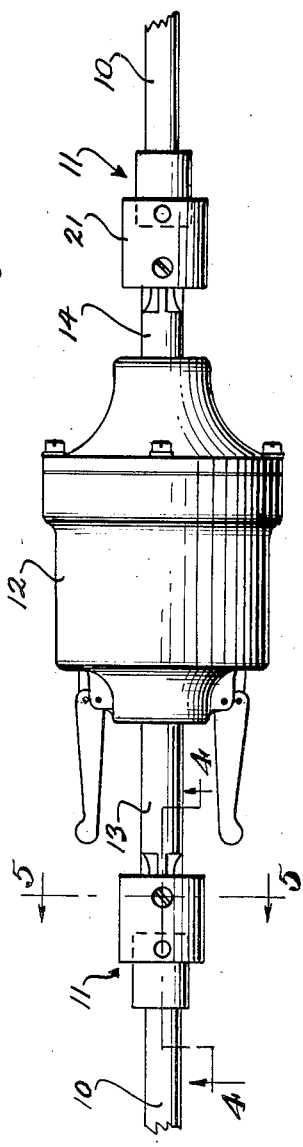
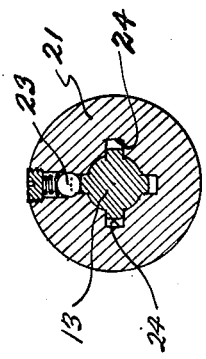
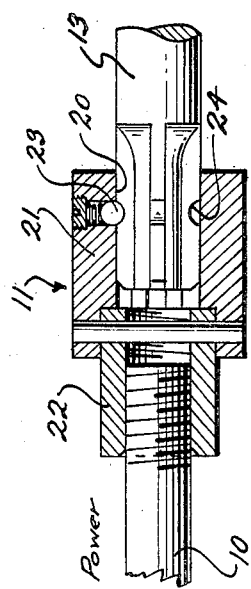
Earl Ginn
Kenneth M. Cloud
INVENTORS
BY G. F. Hauke
Attorney.

May 9, 1950
E. GINN ET AL
2,506,920
HAND POWER LINE
Filed June 28, 1945
2 Sheets-Sheet 2
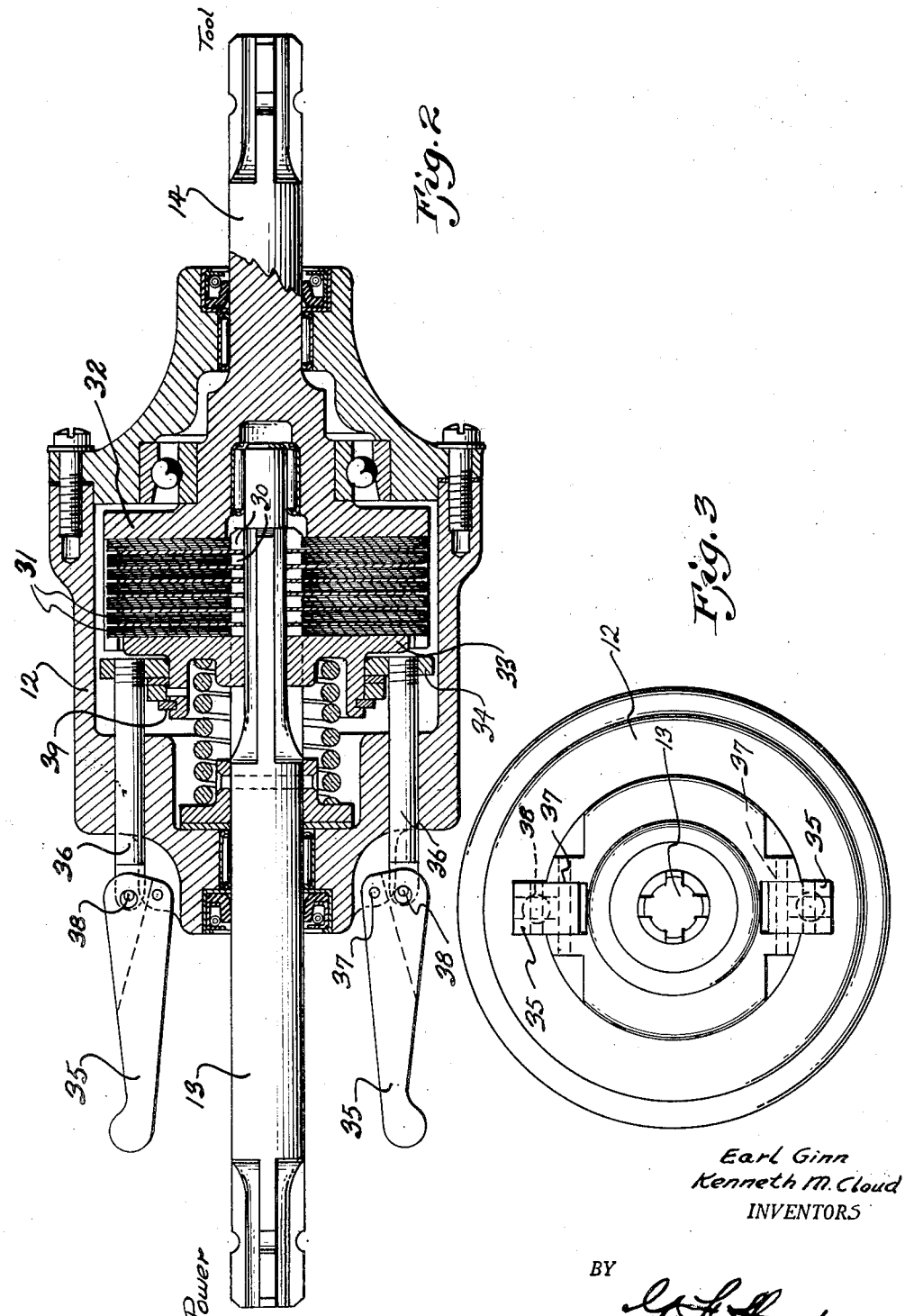
Earl Ginn
Kenneth M. Cloud
INVENTORS Patented May 9, 1950

2,506,920

UNITED STATES PATENT OFFICE 2,506,920

HAND POWER LINE

Earl Ginn and Kenneth M. Cloud, North Muskegon, Mich., assignors to Continental Motors Corporation, Muskegon, Mich., a corporation of Virginia Application June 28, 1945, Serial No. 601,987

3 Claims. (Cl. 192—69)

1

This invention relates to a hand power line and has particularly to do with a manual support for a power line which serves also as a clutch.

It is an object of the invention to provide a relatively light and simple connection for use especially with flexible power shafts which drive tools that must be disengaged from power at the will of the operator.

It is another object of the invention to provide a clutch which may be easily and quickly inserted into a hand line when desired and likewise removed.

A further object has to do with the locating of hand levers in a position to permit the operator to support the clutch assembly thereby and also to protect the operator from the revolving shaft.

For a more detailed understanding of the invention, reference may be had to the accompanying drawings illustrating a preferred embodiment of the invention in which like parts throughout the several views are designated by like numerals, and in which:

Fig. 1 is an assembly view showing the hand support and line connections,

Fig. 2 is a longitudinal section of the hand support and clutch housing,

Fig. 3 is an end elevation of the showing of Fig. 2, and

Fig. 4 and Fig. 5 are sectional views on lines 4—4 and 5—5 of Fig. 1.

In Fig. 1 hand line 10 is separated and each end is provided with an adapter or connection member 11. A manually supportable housing 12 formed of a light material such as aluminum has shafts projecting therefrom, one shaft 13 being a power or driver shaft, and the other shaft 14 being a driven shaft.

The projecting end of each shaft is fluted and notched to cooperate with a fluted recess 20 in ring 21 of adapter 11. Ring 21 is pinned to a coaxial coupler 22 threaded to the flexible shaft 10. A spring pressed ball 23 in ring 21 cooperates with notches 24 on shaft 13.

In Fig. 2 the details of a disengageable clutch are shown. Clutch discs 30 are splined to shaft 13 while interposed discs 31 are splined to the widened end 32 of shaft 14. The engagement plate or pressure plate 33 is spring loaded but is retractable by ring 34 operated by levers 35 and pins 36. Levers 35 are pivoted at 37 on housing 12, and engage pins 36 by reason of a transverse pin 38 passing between bifurcated portions to lie in an enlarged opening therein. Preferably, a ring 39 locks ring 34 on the shoulder of plate 33.

In the operation, it will be evident that an op-

2 erator may carry the weight of the power line by placing his hand around levers 35 which are so positioned that his hand will be spaced from rotating shaft 13. A squeezing action on levers 35 will disengage the clutch while the operator's remaining hand is always free to handle the power tool being driven, or to attach or detach the flexible drive shaft to a machine which is driven thereby.

It will be noted that all exposed revolving parts of the adapters and shafts have no projections that might catch loose clothing or hair of the operator.

Although we have illustrated but one form of our invention and have described in detail but a single application thereof, it will be apparent to those skilled in the art to which our invention pertains, that various modifications and changes may be made therein without departing from the spirit of our invention or from the scope of the appended claims.

What we claim is:

1. A manually operated clutch for a portable power shaft comprising a housing supportable with the power shaft by the hand of the operator, a driven shaft, a disengageable clutch means within said housing arranged to drivingly connect the power and driven shafts, said clutch means and shafts being supported by said housing for relative rotation therewith, driving and driven clutch elements respectively connected with said power and driven shaft, a pressure key keyed to the power shaft, spring means bearing on said pressure plate to engage said clutch elements, a thrust member supported by said housing for axial movement therein and engaging said pressure plate, and levers pivoted to the housing and connected with the thrust member, said levers manually actuated to retract said pressure plate against said spring force to disengage the clutch elements.

2. A manually operated clutch for a portable power shaft comprising a housing supportable with the power shaft by the hand of the operator, a driven shaft, a disengageable clutch means within said housing arranged to drivingly connect the power and driven shafts, said clutch means and shafts being supported by said housing for relative rotation therewith, driving and driven clutch elements respectively connected with said power and driven shaft, a pressure plate keyed to the power shaft, spring means being on said pressure plate to engage said clutch elements, a thrust member supported by said housing for axial movement therein and engaging said pressure plate, and levers pivoted to the housing and connected with the thrust member, said levers manually actuated to retract said pressure plate against said spring force to disengage the clutch elements, said levers projecting rearwardly from said housing and alongside of the power shaft, and operatively constructed for being gripped by the hand of the operator supporting the housing and when manually moved toward the power shaft being operable to release the clutch elements before same can be moved to such an extent as to endanger contact of the power shaft with the hand of the operator.

3. A manually operated clutch for a portable power shaft comprising a housing supportable with the power shaft by the hand of the operator, a driven shaft, a disengageable clutch means within said housing arranged to drivingly connect the power and driven shafts, said clutch means and shafts being supported by said housing for relative rotation therewith, driving and driven clutch elements respectively connected with said power and driven shaft, a pressure plate keyed to the power shaft, spring means being on said pressure plate to engage said clutch elements, a thrust member supported by said housing for axial movement therein and engaging said pressure plate, and levers pivoted to the housing and connected with the thrust member, said levers manually actuated to retract said pressure plate against said spring force to disengage the clutch elements, said levers projecting rearwardly from said housing and alongside of the power shaft.

EARL GINN.
KENNETH M. CLOUD.

REFERENCES CITED

The following references are of record in the file of this patent:

UNITED STATES PATENTS

| Number | Name | Date |
|---|---|---|
| 434,150 | Kruse | Aug. 12, 1890 |
| 858,915 | Sheppard | July 2, 1907 |
| 950,164 | Coates | Feb. 22, 1910 |
| 1,434,128 | Leopold | Oct. 31, 1922 |
| 1,450,202 | Crowley, Jr. | Apr. 3, 1923 |
| 1,985,422 | Pearman | Dec. 25, 1934 |
| 2,089,121 | Hartung | Aug. 3, 1937 |

FOREIGN PATENTS

| Number | Country | Date |
|---|---|---|
| 575,152 | Germany | of 1933 |